United States Patent [19]

Waslo

[11] 4,017,305
[45] Apr. 12, 1977

[54] PROCESS FOR HEAT HARDENING

[75] Inventor: Stephen Waslo, Penn Hills Township, Allegheny County, Pa.

[73] Assignee: United States Steel Corporation, Pittsburgh, Pa.

[22] Filed: Dec. 24, 1975

[21] Appl. No.: 644,249

Related U.S. Application Data

[63] Continuation-in-part of Ser. No. 568,332, April 15, 1975.

[52] U.S. Cl. .................................. 75/34; 75/26; 75/35; 75/91
[51] Int. Cl.² .................................. C21B 13/02
[58] Field of Search ...................... 75/34, 35, 91

[56] References Cited

UNITED STATES PATENTS 3,160,498  12/1964  Olt et al. ........................... 75/35 X
3,850,616  11/1974  Cruse, Jr. ........................... 75/91

*Primary Examiner*—M. J. Andrews
*Attorney, Agent, or Firm*—John F. Carney

[57] ABSTRACT

A method is disclosed for reducing iron ore wherein spent reducing gas may be used as fuel in a reformer, and a portion of the reformer product is used as cooling gas in the bottom portion of the shaft furnace to lower the temperature of the reduced product in a controlled manner whereby the product is rendered more stable and thereby more suitable for storage and shipment.

13 Claims, 1 Drawing Figure

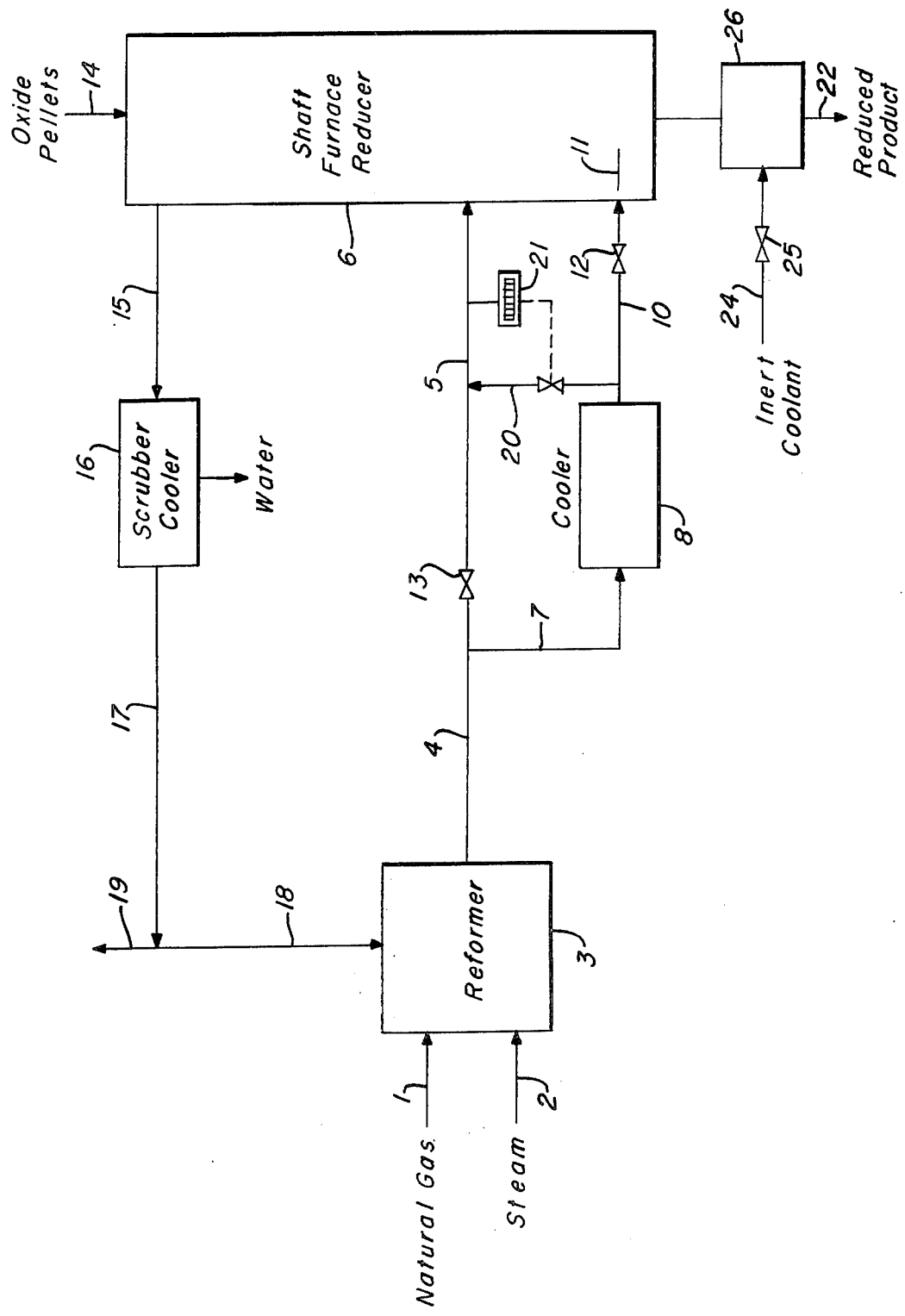

PROCESS FOR HEAT HARDENING

BACKGROUND OF THE INVENTION

This application is a Continuation-in-Part of U.S. Pat. application Ser. No. 568,332, Filed Apr. 15, 1975.

The reduced ore produced by the reduction process disclosed in the parent application, similar to the product of other ore reduction processes, is subject to reoxidation when exposed to the atmosphere due to the fact that the ignition temperature of the material is close to ambient temperature or because of condensation of rain or other moisture. Spontaneous reoxidation devalues the reduced ore, and being an exothermic reaction, is dangerous due to the fire hazard it presents. Another detrimental aspect is that handling effects degradation of the reduced iron product thereby producing undesirable fines which compounds the problem of reoxidation and further devalues the reduced ore.

It is to an improved process for the direct reduction of iron ore in a shaft furnace as described in the aforementioned patent application of which this is a continuation-in-part, therefore, that the present invention is directed.

SUMMARY OF THE INVENTION

According to the present invention there is provided a method of reducing ore with reducing gas passing countercurrent to the ore in a shaft furnace comprising the steps of: (a) introducing about 50 percent to about 70 percent of the reducing gas to the hot zone of said shaft furnace at a temperature of about 1,500° to about 1,750° F; (b) introducing the balance of the reducing gas in a lower portion of said shaft furnace at a temperature of about 70° to about 120° F, said balance of reducing gas being in an amount to maintain the temperature of the reduced ore above 1,500° F for an extended period of time.

By introducing part of the reducing gas at about ambient temperature and at a lower portion of the shaft furnace than that at which the hot reducing gas is introduced and by, further, maintaining the reduced ore at an elevated temperature for an extended period of time, the product that results is characterized by increased density. A more dense ore gives rise to increased product strength and a higher ignition temperature than that which would otherwise result. These beneficial features permit the product to be more degradation-resistant during handling and, further, enable it to be more reoxidation-resistant thus rendering it safer to store and to ship.

BRIEF DESCRIPTION OF THE DRAWINGS

The single FIGURE is a schematic flow diagram of the process according to the present invention.

DESCRIPTION OF A PREFERRED EMBODIMENT

Referring to the drawing, natural gas in line 1 is reformed, preferably in one step, with a small excess of steam or carbon dioxide (i.e. up to 30 percent over stoichiometric) from line 2 in reformer 3 according to known technology. The resulting reformed product stream 4 from the reformer 3 contains from about 88 to about 92, preferably about 92, percent hydrogen and carbon monoxide, at 1,500° to 1,750° F, preferably about 1,750° F, at 15 to 30 psig. The reformed gas stream 4 is then divided into two major branches, indicated as lines 5 and 7 respectively. Line 5 contains the hot gas stream supplying reducing gas in a hot condition directly into the shaft furnace 6. Line 7 conducts a predetermined part of the hot gas from line 4 through cooler 8 where its temperature is reduced to about 80° F and thence via line 10 into the lower region of the shaft furnace 6 at 11. One means for dividing and controlling the flow through the respective lines 5 and 7 is to provide a permanent refractory restriction 13 to cause a pressure drop in line 5. Control and metering of the gas passing through line 7 can be effected downstream of the cooler 8 by means of the usual devices used for these purposes such as flow control valve 12 having temperature and pressure compensation. Because optimum performance of the reformer 3 requires in some cases the gas in line 4 to be higher in temperature than the temperature for reduction in the shaft furnace 6 with regard to sticking or clustering of the burden, a quantity of hot reducing gas from line 4 may be passed to cooler 8 via line 7 whereupon, after being cooled, it is readmitted via line 20 to line 5 to temper the gas stream flowing through the latter. The operating temperature of the gases flowing in line 5 is preferably from about 1,500° to about 1,750° F, and regulation of this temperature is effected by controlling the flow of tempering gas in line 20 by means of temperature regulating device 21.

The operation of the process thus far described is as follows. Iron oxide particles, preferably in the form of pellets, are admitted to the top of the shaft furnace 6 through an inlet therein, indicated as 14 in the drawing. The particles are adapted to gravitate downwardly through the furnace for ultimate discharge through an outlet 22 at the bottom thereof. Hot reducing gas at a temperature of from about 1,500° to about 1,750° F is injected into the furnace at an intermediate location along its length. The gases flow upwardly in countercurrent relation to the downwardly moving particles and, in so doing, heat and chemically reduce the ore.

Simultaneously with the introduction of hot reducing gas, cold gas at a temperature approximating ambient temperature (about 70° to about 120° F) is injected into the lower portion of the furnace at 11. The cold gas flows upwardly through the shaft recuperating the sensible energy of the reduced particles. As the cold gas flows upwardly it is mixed with the hot reducing gas to augment the function of the hot gas of heating and reducing the iron oxide ore.

The spent reducing gases, containing significant amounts of water and carbon dioxide from the reactions of hydrogen and carbon monoxide with the ore, exit the furnace 6 through line 15. The gases are conducted by line 15 to scrubber 16 where water is removed and the gases otherwise conditioned. From the scrubber 16 the gases, containing sufficient energy-producing combustible hydrogen and carbon monoxide to fire the reformer 3, are conducted thereto through lines 17 and 18. Although it is desirable to operate in a thermally balanced system, line 19 can be employed to extract fuel gas from the system for use in ancillary equipment, such as for example, an oxide pellet plant.

Iron oxide pellets which were 95 percent reduced at 1,700° F and discharged from the shaft furnace 6 at about ambient temperature exhibited a composition density having an ignition temperature of from about 325° to about 350° F. This characteristic renders the product prone to reoxidize and subject to degradation during storage and handling. Thus, according to the invention described herein, means are provided to control the rate at which the product is cooled thereby to increase its composition density such that the ignition temperature thereof is increased to about 400° to about 425° F. The resulting product is less prone to reoxidize and is rendered stronger and less subject to degradation.

According to the practice of the present invention the amount and temperature of the cold reducing gas admitted to the lower region of the shaft furnace is controlled to maintain the temperature of the reduced ore at an elevated temperature, i.e., from about 1,500° to about 1,600° F, for an extended period of time, ideally at least 45 minutes. To accomplish this the flow regulator 12 in line 10 is arranged to pass the controlled amounts of cold reducing gas into the furnace 6. The reduced particles exiting the furnace through outlet 22 will be at a temperature significantly higher than ambient temperature, typically at about 400° F, and are therefore passed to a heat exchanger 26 where they are subjected to the cooling effect of an inert gaseous coolant to reduce their temperature down to ambient temperature. The gaseous coolant which may be oxygen-free combustion products are supplied to the heat exchanger through line 24 which contains a flow regulator 25 for controlling coolant admission to the heat exchanger.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. In the production of metallized pellets by the gaseous reduction of iron oxide particles in a shaft furnace the method of thermally densifying said particles to increase the ignition temperature and strength of the product comprising the steps of:
   a. establishing a gravitational flow of said particles by feeding the same to the upper part of said furnace and removing the reduced product from the bottom thereof;
   b. passing a reducing gas in counterflow relation to the flow of said particles through said furnace as follows:
      i. introducing a first portion of said reducing gas at a temperature sufficient to heat said particles to the level necessary to chemically reduce at least 95 percent of said iron oxide at an upstream location in the particle-flow sense of said furnace; and
      ii. introducing a second portion of said reducing gas at a lower temperature at a location downstream of said upstream location, said second portion being in an amount sufficient to maintain the temperature of said particles at a level to thermally densify the reduced particles to raise their ignition temperature to at least 400° F.

2. The method according to claim 1 in which said lower temperature is at about ambient temperature.

3. The method according to claim 1 in which said first portion of reducing gas comprises about 50 to 70 percent of the total reducing gas introduced to said shaft furnace.

4. The method according to claim 1 in which said particles are heated in said shaft furnace to a temperature of at least about 1,500° to 1,750° F.

5. The method according to claim 4 in which said particles are heated in said shaft furnace to a temperature of at least about 1,500° F.

6. The method according to claim 1 in which said second portion of reducing gas is in an amount sufficient to maintain the temperature of said particles above 1,500° F for an extended period of time.

7. The method according to claim 6 in which said particles are maintained above 1,500° F for about 45 to about 100 minutes.

8. The method according to claim 7 in which said particles are maintained above 1,500° F for about 100 minutes.

9. The method according to claim 1 in which the reduced ore is cooled to ambient temperature after discharge from said shaft furnace.

10. The method according to claim 9 in which the reduced ore from said shaft furnace is cooled in a heat exchanger by contact with an inert gaseous coolant.

11. The method according to claim 10 in which said inert gaseous coolant is comprised of oxygen-free combustion products.

12. The method according to claim 1 in which said reducing gas consists essentially of hydrogen and carbon monoxide.

13. The method according to claim 12 in which natural gas is reformed with steam to produce said reducing gas.

* * * * *